United States Patent [19]

Munk

[11] Patent Number: 5,353,585
[45] Date of Patent: Oct. 11, 1994

[54] CONTROLLED FOG INJECTION FOR INTERNAL COMBUSTION SYSTEM

[76] Inventor: Michael Munk, 130 Gun Club Rd., Stamford, Conn. 06903

[21] Appl. No.: 845,374

[22] Filed: Mar. 3, 1992

[51] Int. Cl.$^5$ .............................................. F02G 3/00
[52] U.S. Cl. ................................ 60/39.05; 60/37.53; 60/728
[58] Field of Search ............... 60/39.05, 39.53, 39.58, 60/728, 39.3; 290/1 R, 2

[56] References Cited

U.S. PATENT DOCUMENTS

| | | | |
|---|---|---|---|
| 3,788,066 | 1/1974 | Nebgen | 60/39.05 |
| 4,081,958 | 4/1978 | Schelp | 60/728 |
| 4,231,333 | 11/1980 | Thatcher et al. | 123/440 |
| 4,313,300 | 2/1982 | Wilkes et al. | 60/39.02 |
| 4,417,547 | 11/1983 | Goodman et al. | 123/25 J |
| 4,418,527 | 12/1983 | Schlom et al. | 60/39.53 |
| 4,424,667 | 1/1984 | Fanning | 60/728 |
| 4,510,756 | 4/1985 | Hise et al. | 290/2 |
| 4,667,465 | 5/1987 | Munk | 60/39.3 |
| 4,702,074 | 10/1987 | Munk | 60/39.511 |
| 4,714,032 | 12/1987 | Dickinson | 60/39.05 |
| 4,731,988 | 3/1988 | Munk | 60/39.3 |
| 4,731,990 | 3/1988 | Munk | 60/39.05 |
| 4,773,846 | 9/1988 | Munk | 431/4 |
| 4,928,478 | 5/1990 | Maslak | 60/39.05 |
| 5,163,282 | 11/1992 | Phillips et al. | 60/39.05 |

FOREIGN PATENT DOCUMENTS

| | | | |
|---|---|---|---|
| 0180731 | 10/1983 | Japan | 60/728 |
| 3258926 | 11/1991 | Japan | 60/728 |
| 0614106 | 12/1948 | United Kingdom | 60/39.3 |

Primary Examiner—Richard A. Bertsch
Assistant Examiner—M. Kocharov
Attorney, Agent, or Firm—Martin M. Novack

[57] ABSTRACT

An improved technique is disclosed for a combustion-based power generation system that includes a combustion chamber having an exhaust, a source of input air for the combustion chamber, a source of fuel for the combustion chamber, and a turbine and generator communicating with the combustion chamber for obtaining power from the combustion. The method includes the steps of: heating and humidifying the input air; sensing a condition of the heated and humidified input air, and generating a control signal in response to the sensed condition; and cooling the heated and humidified input air before it is input to the combustion chamber. Humidified input air that is at too high a temperature, or which is not saturated, is sensed, and appropriate trim cooling is provided to obtain the desired condition for the humidified input air. In this manner, maximum humidification is achieved while avoiding overheating and maintaining operating temperature in a desired range.

12 Claims, 5 Drawing Sheets

CONTROLLED FOG INJECTION FOR INTERNAL COMBUSTION SYSTEM

BACKGROUND OF THE INVENTION

This invention relates to internal combustion engine systems and, more particularly, to improvements in such systems which decrease noxious emissions, increase operating efficiency, and reduce maintenance requirements. The invention is applicable to combustion turbine power generating systems and other combustion based systems.

The emission of noxious gases by internal combustion engines (including Brayton turbine combustion cycle systems, diesel engines, Otto-cycle spark ignition engines, and the like) is a continuing problem. From an environmental standpoint, the noxious gases are unacceptable pollutants, and government has become heavily involved in the regulation of emission of such noxious gases. The cost to society is very substantial, as measured by the degradation of the environment plus the cost of limiting or controlling such emissions, which is ultimately paid by the consumer. It is also well known that a combustion process which results in a high level of noxious emissions is generally less efficient, from the standpoint of energy output, than the same process operating in a manner which results in a lower level of noxious emissions.

It has long been recognized in the art that controlled injection of water into a combustion engine can, under certain conditions, increase the operating efficiency and reduce the noxious emissions in the exhaust. One drawback of old water injection techniques was the almost immediate corrosion which can occur when water is introduced (either intentionally or during an injection malfunction) directly to hot engine components.

The products of combustion are rich in oxides of nitrogen ($NO_x$) formed when unburned oxygen combines with nitrogen, the inert component of ambient air at elevated temperatures. $NO_x$ is an environmental hazard. Excess air is technically defined as that quantity in excess of the theoretical quantity required for complete combustion of a fuel. The combustion turbine, to which the present invention has particular although not exclusive application, operates at very high excess air rates. The high excess air rates produce high levels of noxious and toxic $NO_x$. Fuel-bound nitrogen and sulfur also cause problems.

It is known that $NO_x$ and other noxious emissions can be reduced by water injection in the combustion chamber, which reduces flame temperatures. Unfortunately, heat needed to vaporize the injected water is wasted energy. Also, to preclude scaling, costly ultra-pure water is needed. Externally produced steam has also been used as an injection medium to reduce $NO_x$, but this requires substantial additional energy and adds additional environmental hazards due to volatile anti-corrosive chemicals found in high pressure steam.

In the U.S. Pat. No. 4,313,300, the quantity of $NO_x$ emissions generated by a combined gas turbine-steam boiler power plant is controlled by recycling steam boiler exhaust gas to the air compressor of the gas turbine, thereby increasing the combustor inlet humidity.

In the U.S. Pat. No. 4,231,333 fuel or water injection into an internal combustion engine is controlled based upon detection of predetermined engine conditions, such as pressure within the engine intake manifold.

In the U.S. Pat. No. 4,417,547 atomized fluid from a nozzle is injected into the carburetor of an internal combustion engine, the rate of fluid injection being varied in response to variations in engine speed and engine load.

My U.S. Pat. Nos. 4,667,465, 4,702,074, 4,731,990, 4,773,846, and 4,731,988 disclose internal combustion engine systems which improve over the above described types of systems, and which decrease noxious emissions, increase operating efficiency, and reduce maintenance requirements. These systems disclose, inter alia, that an ultrasonic fog generator can be used to advantage in injecting a fog into the air received by a combustion chamber in order to improve the efficiency of the combustion chamber and/or reduce the noxious emissions in the exhaust of the combustion chamber. A combustion-based system disclosed in my referenced patent is a turbine power generator which includes a source of input air, a source of fuel, a compressor which receives the input air, a combustion chamber which receives air from the output of the compressor and fuel from the source of fuel, a turbine which receives exhaust gases from the combustion chamber, and an electrical generator mechanically coupled with the turbine. A fogging device is provided and communicates with the input air, the fogging device being adapted to receive a fogger air supply and a fogger water supply, and to generate a fog in the source of input air. The fogging device can operate to achieve evaporation to dryness prior to entry into the combustion chamber; the vapor phase of the water being much less harmful than the liquid. A sensor is provided for sensing noxious emissions in the exhaust gases. The fogging device is controlled in accordance with the sensed noxious emissions. My referenced patents also disclose that heat exchange from the combustion exhaust can be used in a controlled manner to heat the input air to be fogged, that the fog can be controlled by a humidity and dewpoint sensor to assure only a vapor phase at entry to the combustion chamber, and that a supply of chemical suitable for reacting with a component of the noxious emissions (for example calcium carbonate or bicarbonate or calcium oxide to react with sulfur in noxious sulfur dioxide) can be combined with the water supplied to the fogging device.

My referenced patents describe a number of advantages of the disclosed techniques, including the following:

The formation of $NO_x$ is endothermic and removes available energy. Accordingly, by reducing $NO_x$ formation, a substantial increase in efficiency can be obtained.

Excess air is diminished as fog vapor displaces excess air at the input to the combustion chamber. Less excess air can result in less $NO_x$ formation.

When a fog, which has droplets of about 10 microns or less size, is produced, minerals dissolved therein are evaporated to dryness and travel, with little deleterious effect, through engine components as sub-micron dust particles. This can reduce the need for expensive ultra-pure water, often used for engine water injection in industry.

The use of an ultrasonic fogger is advantageous in providing a uniform humidity in the air which enters the combustion chamber, which overcomes uniformity problems associated with some water injection techniques.

By modifying the fog water content as a function of the measured noxious emissions, the fog can be precisely tailored to minimize noxious emissions.

Figure 1:
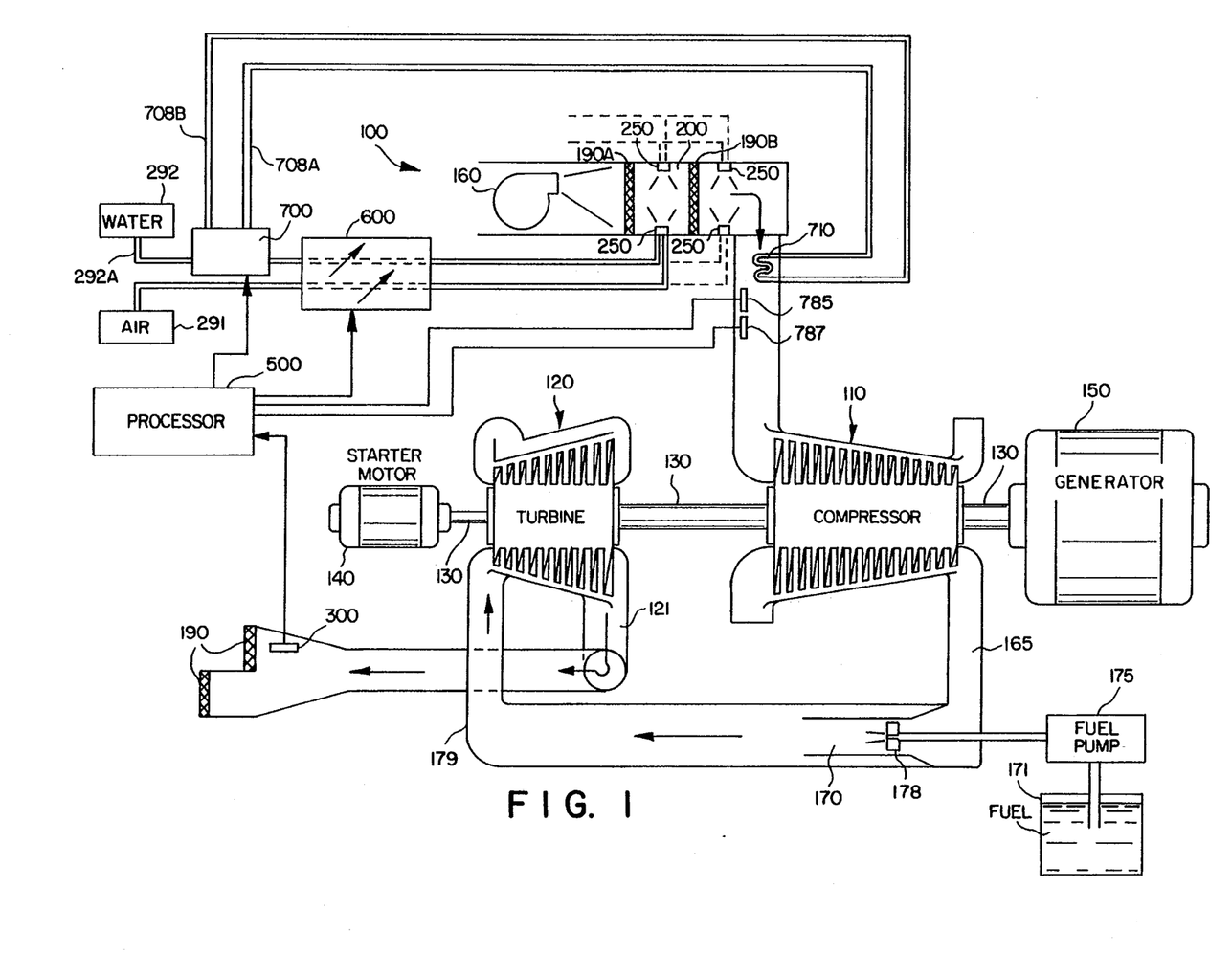

Although the described type of combustion-based system with fog injection provides substantial improvements over previous approaches, there is room for further improvement. In the humidification process the zone between saturation and super-saturation has a fringe area due to droplet accumulation created by dynamic impact and agglomeration of droplets and this zone is to be avoided for an engine air intake. A safe humidifier operating range is found at about 80% of saturation where droplets resulting from any intake air humidification may be absorbed because of statistical molecular dynamic relationships between air (gaseous molecules) and small droplets (capillary bound bundles of water molecules) in collisions that permit liquid absorption. This means that actual humidifier output must be limited to something under the rate of water required to saturate the air stream because no humidifier can saturate, with precise uniformity, the air stream being humidified. This also means that the air is superheated with respect to its dewpoint temperature. The fraction of the air that is not saturated is overheated. Overheated air can result in loss of capacity and the tendency to increase noxious emissions in the exhaust gases. Accordingly, operating within a controlled small optimum temperature range, while providing the desired moisture in the input air for reduction of noxious emissions, can be problematic. It is among the objects of the present invention to address this problem.

Compressor and turbine blade fouling is a problem which also substantially impacts engine performance and noxious emission in power plant operations. Prior art solutions have generally been inadequate. Reference can be made, for example, to Thames et al., "On Line Compressor Washing Practices And Benefits", pp. 1–6 (1989), which shows percentage losses attributable to blade fouling and advocates on-line crank-wash equipment with detergents to minimize crank-wash shutdowns. Thames et al. also presents the pros and cons of aspirated talcs for blade polishing as compared to crank-wash cycles. With either case, falling efficiencies caused by compressor blade fouling will cause power output to fall unless additional fuel is added to hold engine RPM constant. Additional fuel use, at lowered engine efficiency results in increased combustion temperatures which in turn raise $NO_x$ emissions. It is also among the objects of the invention to address the problem of compressor and turbine blade fouling in prior art power generation systems.

As noted above, heat exchange from exhaust gases has been used in prior art systems for functions such as preheating of input air. It is among the further objects of the invention to address further problem of wasted heat from power generation equipment and achieve additional efficiencies.

Further features and advantages of the invention will become more readily apparent from the following detailed description and taken in conjunction with the accompanying drawings.

SUMMARY OF THE INVENTION

In accordance with a form of the present invention, humidified input air that is at too high a temperature, or which is not saturated, is sensed, and appropriate trim cooling is provided to obtain the desired condition for the humidified input air. In this manner, maximum humidification is achieved while avoiding overheating and maintaining operating temperature in a desired range. Refrigerated coils have, in the past, been used to cool engine air intake for the purpose of decreasing the specific volume of air intake. As indicated in the present invention trim cooling is used, after humidification, to avoid overheating, control operating temperature range, and optimize the benefits of additive moisture to the combustion chamber. In a preferred embodiment of this form of the invention the humidifier, supply water is used in cooling the fogged input air, when required. This operation also serves the useful purpose of heating the supply water before it reaches the humidifier, thereby increasing overall efficiency.

In accordance with a further form of the invention, sub-micron to micron particles are applied using alkaline blended water chemistry treatment of a fogging humidifier's water supply. Blended water is used to produce water to mineral concentrations such that when evaporated to dryness in a fogging absorption process the evaporated water droplets will leave air stream entrained talc sized inert mineral particles capable of polishing both compressor and turbine blading. An appropriate polishing agent chemical is added to the fogger water supply when an exhaust condition is sensed that indicates the necessity for such action, such as by sensing the exhaust temperature and/or the concentration of noxious emissions in the exhaust. In this manner, the need to suspend operation for a separate cleaning routine is eliminated, and cleaning is implemented, whenever necessary, automatically or semiautomatically.

In a further form of the invention, waste heat from an electrical generator is used to advantage for heating a humidifying apparatus.

Further features and advantages of the invention will become more readily apparent from the following detailed description when taken in conjunction with the accompanying drawings.

BRIEF DESCRIPTION OF THE DRAWINGS

FIG. 1 is a block diagram, partially in schematic form, of an apparatus in accordance with an embodiment of the invention and which can be utilized to practice an embodiment of the method of the invention.

FIG. 2 is a diagram, partially in schematic cross-sectional form, of a fogging unit that can be utilized in disclosed embodiments of the invention.

FIG. 3 is a schematic diagram, partially in block form, of a portion of the FIG. 1 embodiment.

FIG. 4 is a flow diagram of a routine for the processor of the FIG. 1 embodiment.

FIG. 5 is a simplified schematic diagram, partially in block form, which illustrates a further feature of the invention.

DESCRIPTION OF THE PREFERRED EMBODIMENT

Referring to FIG. 1, a combustion turbine power generating system is shown, and conventionally includes a compressor 110 and a turbine 120 which are mounted on a common shaft 130 that is coupled, in the present embodiment, to a starting motor 140 and an electrical generator 150. A blower 160 provides a forced draft of ambient air 100 through a chamber which includes a fogging subsystem 200 and then through input duct 115 to the input opening of compressor 110. Compressed air is coupled from the output of compressor 110, via the duct 165, to an input of a combustion chamber 170. A source of fuel 171 is fed to the combustion chamber 170 via a fuel pump 175 and a fuel nozzle 178. The hot combustion gases from combustion chamber 170 and bypass air are fed to the input of turbine 120 via the duct 179. As described in my above-referenced U.S. patents, the exhaust gases output from the turbine at 121 can be passed through a heat exchanger (represented at 190) which reclaims some of the heat of the exhaust gases, this heat being used for preheating of the input air, as indicated by the coils 190A and 190B.

As also described in my above-referenced U.S. patents, a noxious emission sensing unit 300 can be disposed in the path of the exhaust gases; i.e., it can be located in said exhaust gases from the combustion chamber 170 before or after the turbine 120. As illustrated, although not necessarily, the sensing unit 300 is located at the output port from which the exhaust gases leaving the turbine are emitted. The sensing unit 300 can include one or more sensing devices.

The fogging subsystem 200, which includes one or more fogging devices, is located in the path of the air that is input to the compressor 110. In the illustrated embodiment four ultrasonic fogging devices 250 are shown, two positioned after the heating coil 190A and two after heating coil 190B.

As used herein, "fog" means water droplets in air that have a size of the order of 10 microns or less, are relatively unstable due to their small volume as compared to their surface area, and therefore evaporate to dryness in the air. The water droplets are propelled by the force of compressed air at velocities high enough to assure uniform mixing through cross flow injection into a receiving air stream. An embodiment of a fogging device 250, as disclosed in my above-referenced U.S. patents, is shown in simplified form in FIG. 2.

Figure 2:
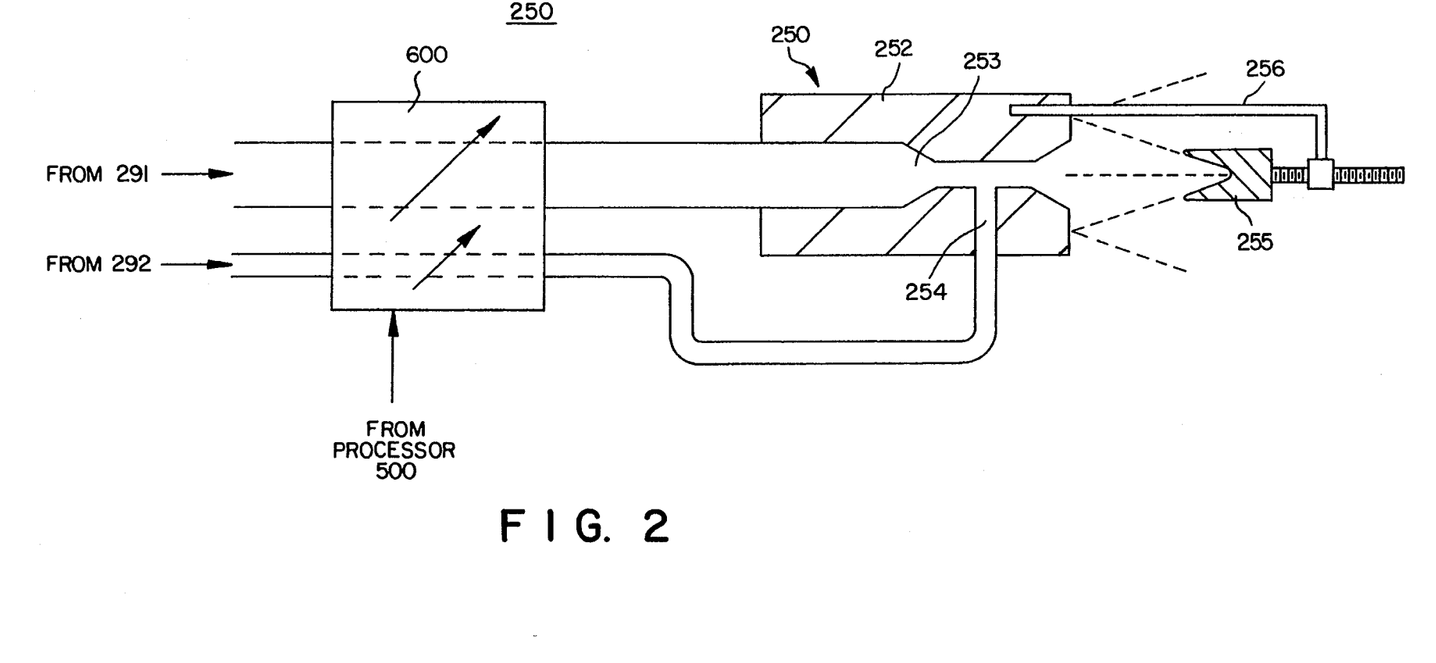

Each fogging device of the present embodiment comprises a nozzle 251 having a cylindrical body 252 with a central bore 253. Compressed air from a source 291 is coupled to the bore 253. The compressed air may alternatively be bled from compressor 110. Water under pressure, from a source 292, is coupled through a transversely disposed conduit 254 that communicates with the bore 253. An adjustable resonator cup 255, facing the nozzle opening at the front end of bore 253, is mounted on an "L"-shaped standoff 256 that extends from body 252 and permits controlled dispersion of the fog.

In operation, as the pressurized air pulsates through the bore 253, water pulsates through the conduit 254 and mixes with the air in the bore 253. The ultrasonic standing shock wave in the bore shears the water particles into fine droplets. The resonator cup 255 reflects the high speed air against the emerging water particles or droplets in a manner that reduces the water droplets to a size of the order of 10 microns or less, and deflects these minute droplets outward for cross flow mixing with the primary air flow passing through the fogging subsystem 200. The droplets are formed in a tunable field whose shape can be selected by the variable distance between the opening and front flat reflective face of nozzle 251 and the resonator cup 255. The flow of both compressed air and water input to the fogging devices 250 is controlled by control unit 600, so as to increase or decrease the volume of generated fog at uniform fog density. As described in detail in my above-referenced U.S. Patents, the control unit can be under control of processor 500 (FIG. 1) which operates to control the fogging in accordance with the concentration of noxious emissions sensed by sensor 300. Ultrasonic foggers are also disclosed, for example, in U.S. Pat. Nos. 4,042,016 and 4,118,945.

Figure 3:
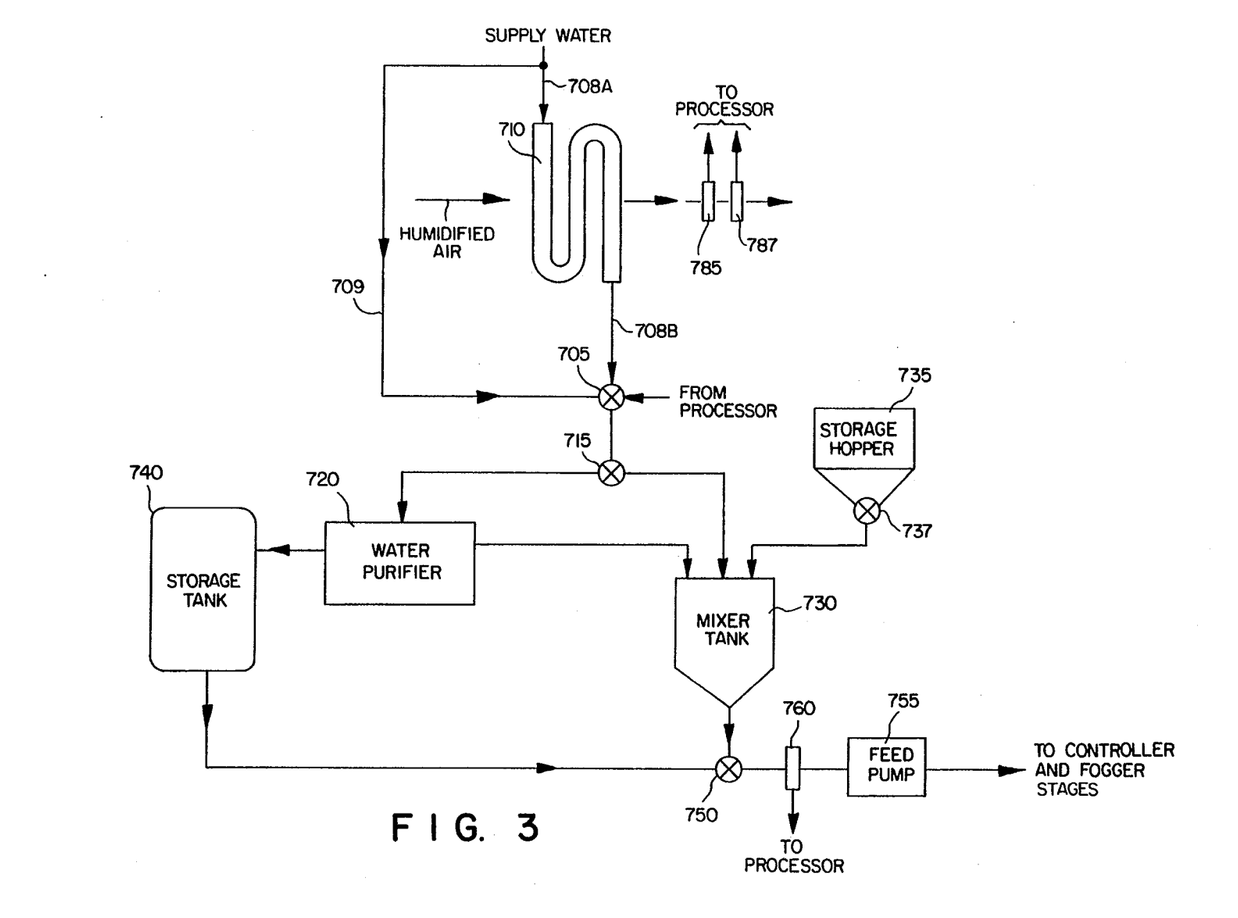

In the embodiment of FIG. 1, the fogger water supply from source 292 is coupled via subsystem 700 to control unit 600, the subsystem 700 being shown in further detail in FIG. 3. Referring to FIG. 3, a branch 292 carries raw supply water. A valve 705 permits flow via either branches 708A, 708B and cooling coils 710 (which are in the path of the humidified input air—see also FIG. 1), or a bypass branch 709. In the present embodiment, the valve 705 is electrically controlled by a signal from processor 500. The output of valve 705 is coupled, via a valve 715, to a reverse osmosis water purifier 720 and to a mixing tank 730. The mixing tank 730 also receives an alkaline chemical, such as lime or caustic soda, from a storage hopper 735 via a hopper feed valve 737. The output of purifier 720 is stored in a storage tank 740. The outputs of storage tank 740 and mixer tank 730 are coupled to a concentration control valve 750, the output of which is coupled to a fogger feed pump 755 via a line that can contain a pH sensor 760. The output of the fogger feed pump 760 is coupled to the controller 600 and then the fogger stages 250.

A temperature sensor 785 and a dewpoint sensor 787 are disposed in the path of the fogged air, as seen in FIGS. 1 and 3. Signals from the temperature sensor and the dewpoint sensor are coupled to processor 500. In operation, when the temperature of the fogged air is above a predetermined threshold and/or the fogged air dewpoint is not reached, the processor produces a control signal to the valve 715 to cause flow of the fogger supply water through the cooling coils 710 so as to cool the fogged air below a predetermined temperature and to its dewpoint. Also, the exhaust temperature and/or the concentration of noxious emissions can be utilized to control the valve 750 to determine the concentration of the alkaline chemical (e.g. lime or caustic soda) added to the fogger water in order to clean the compressor and turbine blades. The pH sensor can be utilized to monitor the chemical concentration.

Figure 4:
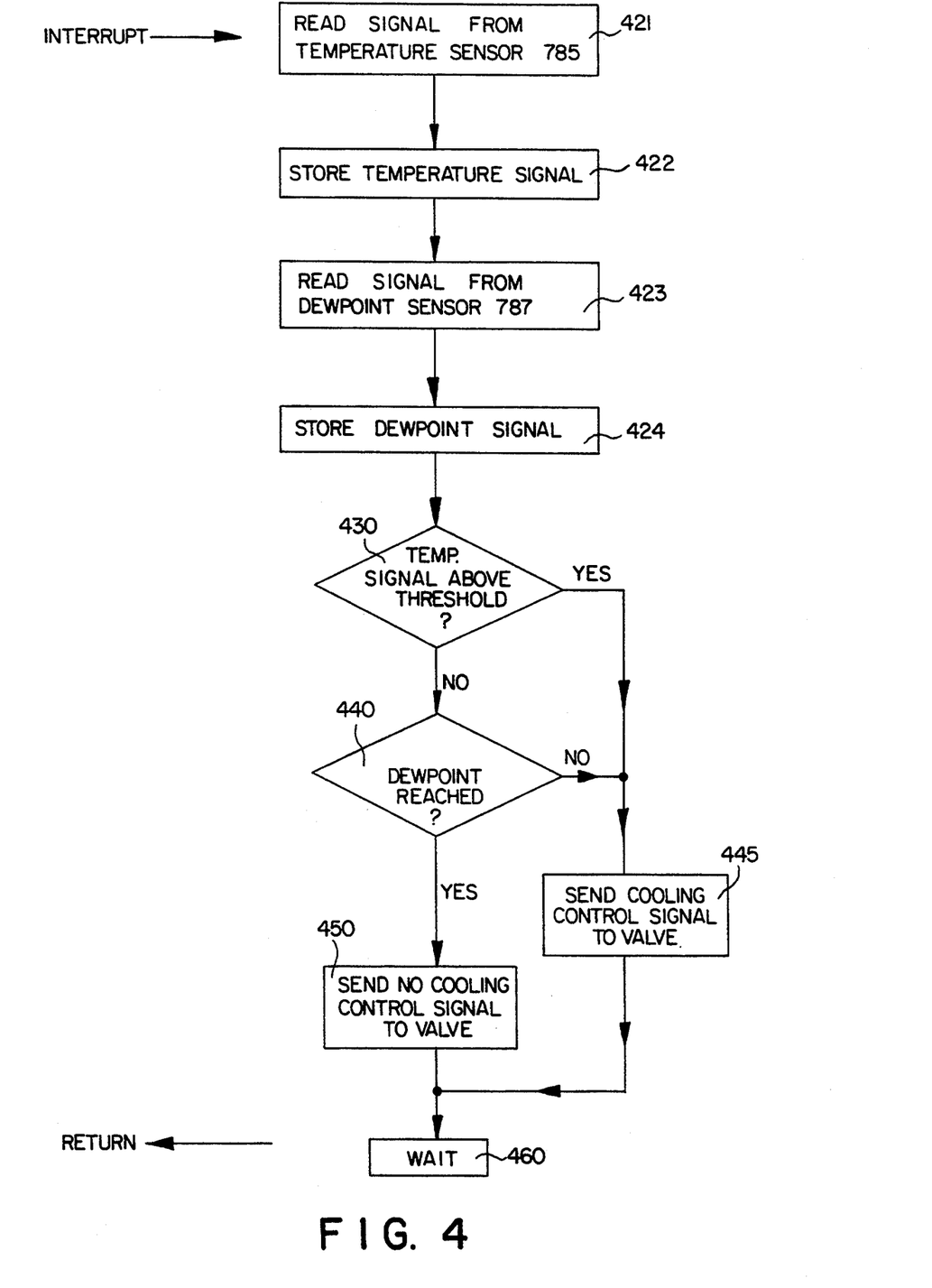

The processor 500 may comprise any suitable microprocessor, such as a Model 360 processor sold by Intel Corp. or other suitable general or special purpose digital or analog processors, having the conventional associated clock, memory, and input/output peripherals. Referring to FIG. 4, there is shown a flow diagram of a routine under which the processor 500 can be controlled to receive signals from the temperature and dewpoint sensors 785, 787 and generate control signals for controlling the valve 705. In the routine of FIG. 4, interrupt signals are generated periodically or at a rate determined by the operator. Upon an occurrence of an interrupt signal, the signals from the temperature and dewpoint sensors are read and stored, as represented by the blocks 421–424. A determination is then made (decision diamond 430) as to whether a predetermined threshold has been exceeded. If so, the block 445 is entered. If not, diamond 440 is entered, and a determination is made as to whether the dewpoint signal indicates that the dewpoint has been reached. If so, the block 450 is entered and, if not, the block 445 is entered. The block 445 represents the issuance of a signal to valve 705 to cause flow in cooling coils 710 when the indicated temperature condition or the indicated dewpoint condition is met. The block 450 represents the issuance of a signal to valve 705 to stop the flow in the cooling coils when the cooling has resulted in the appropriate lowering of the temperature and maintaining of the dewpoint. [The valve could also be used to modulate flow between the paths with appropriate fractional selection.] The block 460 is then entered, and the next interrupt is awaited. Accordingly, the cooling of the humidified air is controlled in accordance with the sensed temperature and dewpoint. Maximum humidification is achieved while avoiding overheating and maintaining operating temperature in a desired range. It will be understood that the cooling can be implemented using other automatic and/or manual techniques. While it is preferable to use the humidifier supply water for the trim cooling hereof (as this serves to also implement some preheating of water which is needed anyway), some or all of the cooling may be implemented by other means.

In the illustrated embodiment, the blade cleaning phase with the alkaline chemical can be implemented manually by controlling valve 750, or automatically, such as when either noxious emissions or exhaust gas temperature are above a certain level. A routine for automatic control of chemical addition to fogger supply water, for another purpose, is disclosed in my above-referenced U.S. patents.

Figure 5:
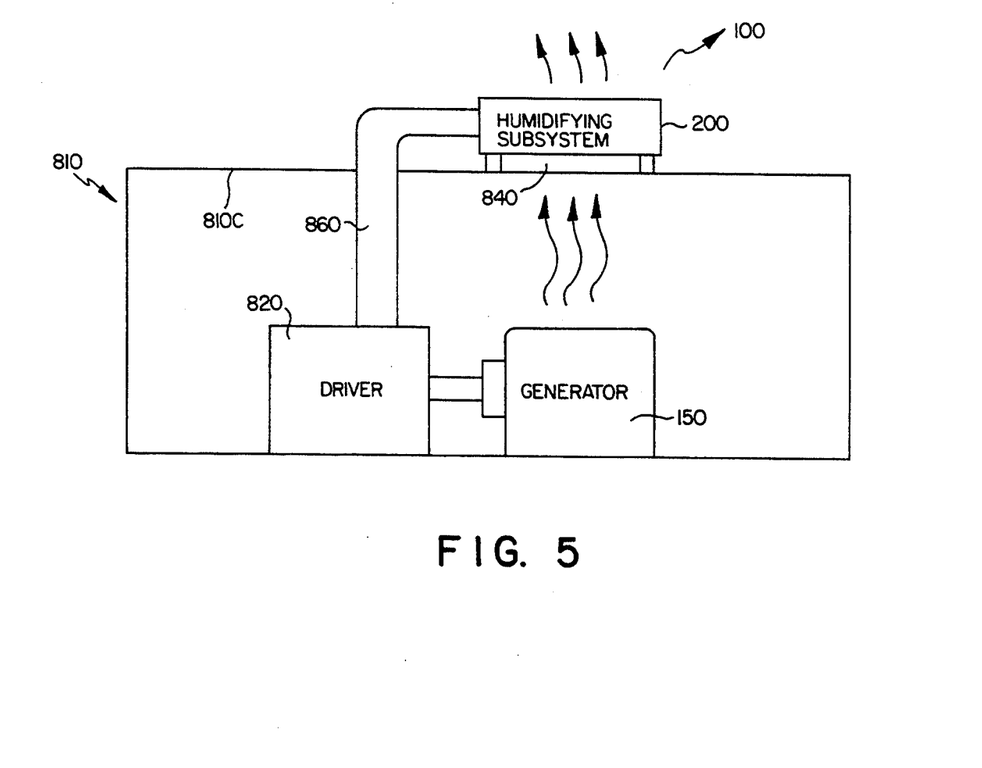

FIG. 5 illustrates an advantageous arrangement of the FIG. 1 power generation equipment in accordance with a further feature of the invention. A room 810 houses the power generation equipment (e.g. of FIG. 1), including the generator 150, and the drive means 820, which can include the compressor, combustion chamber, and turbine, as previously represented. The ceiling 810A of the room 810 has an aperture 840, that can be provided with a screen and baffle (not shown). Mounted above the aperture is a humidifying subsystem such as the fogging subsystem 200 of FIG. 1, the subsystem 200 being coupled with the drive means 820, as in FIG. 1, by air, water, and control lines represented collectively at 860. Waste heat from the generator 150 rises through the aperture to assist in the heating of the humidifying apparatus. Further venting can then be through a venting aperture in the roof above subsystem 200 (not shown), or the subsystem 200 can be roof mounted.

The invention has been described with reference to particular preferred embodiments, but variations within the spirit and scope of the invention will occur to those skilled in the art. For example, as indicated above, the invention also has application to other types of internal combustion engines and to other modes of humidification. Also, other arrangements of the components of the turbine power generation system and the humidification can be employed. [As an example, my above-referenced U.S. patents illustrate fogging of the air at the compressor output.] Finally, it will be understood that the control processor can utilize various other techniques for obtaining output control signals from the sensed parameters.

I claim:

1. For use in a combustion-based system including a combustion chamber having an exhaust, a source of input air for said combustion chamber, a source of fuel for said combustion chamber, and means communicating with said combustion chamber for obtaining power from said combustion; a method comprising the steps of:

heating and humidifying said input air;

sensing dewpoint of the heated and humidified input air, and generating a control signal in response thereto; and cooling the heated and humidified input air before it is input to said combustion chamber.

2. The method as defined by claim 1, further comprising the steps of sensing noxious emissions in said exhaust gases, and controlling said humidifying in response to the sensed noxious emissions.

3. For use in a combustion-based system including a combustion chamber having an exhaust, a source of input air for said combustion chamber, a source of fuel for said combustion chamber, and means communicating with said combustion chamber for obtaining power from said combustion; the improvement comprising:

means for heating and humidifying said input air;

means for sensing dewpoint of the heated and humidified input air and for generating a control signal in response thereto; and cooling means, controlled by said control signal, for cooling the heated and humidified input air before it is input to said combustion chamber.

4. Apparatus as defined by claim 1, wherein said humidifying means includes a humidifier water supply, and wherein said cooling means implements cooling of said input air with water from said humidifier water supply, thereby also heating said water.

5. Apparatus as defined by claim 1, further comprising means for sensing noxious emissions in said exhaust gases, and means for controlling said humidifying means in response to the sensed noxious emissions.

6. Apparatus as defined by claim 3, wherein said means for obtaining power comprises a turbine driven by the combustion chamber and an electrical generator driven by said turbine.

7. For use in a combustion-based system including a combustion chamber having an exhaust, a source of input air and a source of fuel for respectively providing input air and fuel to said combustion chamber, and means communicating with said combustion chamber for obtaining power from said combustion; the improvement comprising:

a fogger air supply;

a fogger water supply;

means for heating said fogger air supply;

a fogging device communicating with said input air, said fogging device being adapted to receive heated air from said heating means and water from said fogger water supply, and to generate a fog in said input air;

means for sensing dewpoint of the fogged input air and for generating a control signal in response thereto; and cooling means, controlled by said control signal, for cooling the fogged input air.

8. Apparatus as defined by claim 7, wherein said cooling means implements cooling of said fogged input air with water from said fogger water supply, thereby heating said water.

9. Apparatus as defined by claim 7, further comprising means for sensing noxious emissions in said exhaust gases, and means for controlling said fogging device in response to the sensed noxious emissions.

10. Apparatus as defined by claim 7, wherein said means for obtaining power comprises a turbine driven by the combustion chamber and an electrical generator driven by said turbine.

11. An electric power generating system, comprising:

a room having a ceiling;

a turbine power generating equipment including a source of input air, a source of fuel, a compressor which receives said input air, a combustion chamber which receives fuel from said source of fuel and input air from said compressor, a turbine which receives exhaust gases from said combustion chamber, and an electrical generator mechanically coupled with said turbine;

a humidifying apparatus for humidifying said input air;

said ceiling having an aperture therein above said electrical generator; and at least a portion of said humidifying apparatus being located above said aperture;

whereby, waste heat from said generator provides heating to said humidifying apparatus.

12. The system as defined by claim 11, wherein said humidifying apparatus comprises fogging equipment that receives a fogger air supply and a fogger water supply, and is operative to generate a fog in said input air.

* * * * *